United States Patent
Sicius et al.

(10) Patent No.: US 6,986,852 B2
(45) Date of Patent: Jan. 17, 2006

(54) PROCESS FOR CONDITIONING STANDING AND FLOWING WATER SYSTEMS

(75) Inventors: Hermann Sicius, Düsseldorf (DE);
Thomas Sildatke, Leverkusen (DE);
Thomas Menzel, Hilden (DE);
Wolfgang Wambach, Köln (DE);
Winfried Joentgen, Köln (DE);
Thomas Klausa, Oberhausen-Rheinhausen (DE); Thomas Klein, Köln (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/935,988

(22) Filed: Aug. 23, 2001

(65) Prior Publication Data

US 2002/0125199 A1 Sep. 12, 2002

(30) Foreign Application Priority Data

| Aug. 25, 2000 | (DE) | 100 41 904 |
| Oct. 13, 2000 | (DE) | 100 50 904 |
| Jan. 16, 2001 | (DE) | 101 01 671 |

(51) Int. Cl.
*C02F 5/14* (2006.01)
*C02F 4/12* (2006.01)

(52) U.S. Cl. ............... 252/180; 252/181
(58) Field of Classification Search .......... 252/181, 252/180
See application file for complete search history.

(56) References Cited

U.S. PATENT DOCUMENTS

| 3,052,655 | A | 9/1962 | Fox et al. |
| 3,846,380 | A | 11/1974 | Fujimoto et al. |
| 4,088,678 | A | 5/1978 | Matt et al. |
| 4,279,768 | A | 7/1981 | Busch ............ 252/180 X |
| 4,561,981 | A | 12/1985 | Characklis ........ 252/180 X |
| 4,738,897 | A | 4/1988 | McDougall et al. ... 252/180 X |
| 4,839,461 | A | 6/1989 | Boehmke ............ 528/363 |
| 5,038,861 | A | 8/1991 | Shuler ............ 166/279 |
| 5,071,587 | A | 12/1991 | Perman .......... 252/180 X |
| 5,175,285 | A | * 12/1992 | Lehmann et al. ...... 528/341 |
| 5,219,952 | A | 6/1993 | Koskan et al. ........ 525/419 |

(Continued)

FOREIGN PATENT DOCUMENTS

| CH | 689 452 | 4/1999 |
| EP | 0 302 522 | 2/1989 |
| EP | 0 310 099 | 4/1989 |
| EP | 0 238 729 | 6/1991 |
| EP | 0 225 596 | 7/1991 |
| EP | 0 238 853 | 11/1991 |
| EP | 0 330 876 | 1/1992 |
| EP | 0 314 083 | 1/1993 |
| EP | 0 238 852 | 4/1993 |
| EP | 0 265 846 | 9/1994 |
| EP | 0 517 470 | 4/1996 |
| WO | 95/16726 | 6/1995 |
| WO | 98/47964 | 10/1998 |

OTHER PUBLICATIONS

Swiss Construction Journal of SIA, No. 12, Mar. 24, 2000, pp. 244–253, "Entwässerung Bergmännischer Tunnel—neue Tendezen", Jan Dirk Chabort, Michael Rehbock-Sander.

*Primary Examiner*—Daniel S. Metzmaier
(74) *Attorney, Agent, or Firm*—Diderico van Eyl; Jennifer R. Seng; Jill Denesvich

(57) ABSTRACT

The invention relates to a novel conditioning agent based on polysuccinimide, its hydrolysates or its partial hydrolysates, for preventing deposits in standing or flowing water systems.

7 Claims, 1 Drawing Sheet

U.S. PATENT DOCUMENTS

| | | | | |
|---|---|---|---|---|
| 5,266,237 A | * 11/1993 | Freeman et al. | ............ | 510/220 |
| 5,328,633 A | 7/1994 | Hasting et al. | ......... | 252/180 X |
| 5,371,180 A | 12/1994 | Groth et al. | ................ | 528/363 |
| 5,474,718 A | 12/1995 | Eastman | ................ | 252/180 X |
| 5,510,038 A | 4/1996 | Wegmüller | ................ | 210/698 |
| 5,523,023 A | 6/1996 | Kleinstück et al. | | |
| 5,527,863 A | 6/1996 | Wood et al. | ............ | 252/181 X |
| 5,552,518 A | * 9/1996 | Wood et al. | ................ | 528/363 |
| 5,655,601 A | 8/1997 | Oddo et al. | .................. | 166/279 |
| 5,658,464 A | 8/1997 | Hann et al. | ............. | 252/180 X |
| 5,681,475 A | 10/1997 | Lamensdorf et al. | ... | 252/181 X |
| 5,876,623 A | 3/1999 | Tang et al. | ................. | 252/180 |
| 5,942,150 A | * 8/1999 | Heuer et al. | .................. | 252/70 |
| 5,962,400 A | * 10/1999 | Thomaides et al. | ......... | 510/471 |
| 6,054,553 A | 4/2000 | Groth et al. | ................. | 528/335 |
| 6,462,006 B1 | * 10/2002 | Sorg et al. | .................. | 510/220 |

\* cited by examiner

PROCESS FOR CONDITIONING STANDING AND FLOWING WATER SYSTEMS

BACKGROUND

The present invention relates to a process for conditioning standing and flowing water systems using polysuccinimide and novel conditioning agents based on polysuccinimide (PSI) or its partial hydrolysates in combination with fatty acids or their derivatives for preventing deposits which form in standing or flowing water systems owing to hardness-forming ions.

For the purposes of the present invention, flowing water systems are construction drainage systems or drains, but also injection water in the exploration of raw materials, in particular oils or natural gases, particularly preferably in "squeeze" operations in oil extraction (disclosed by U.S. Pat. No. 5,655,601). Flowing water systems include but are not limited to ground waters, effluent waters, and leachate waters.

For the purposes of the present invention, the term "construction" or "constructions" refers to structures such as buildings, tunnel structures, galleries, caverns, barrages, retention basins, hydroelectric power plants, earth dams, retaining walls, road construction works, slope drainage systems, water drainage channels, well containments or provisional construction pits. For the purposes of the present invention, constructions also are infrastructure facilities such as landfills (for municipal or commercial waste) including the drainage system passing through these, and also bridges and their drainage systems.

For the purposes of the present invention, standing water systems are, for example, standing waters in swimming pools or as a matrix in subterranean oil deposits.

Conditioning agents based on PSI are taken to mean, for the purposes of the present invention, PSI itself, its copolymers or its partial hydrolysates as are obtained, for example, from the reaction of aspartic acid with aspartic acid sodium salt according to WO 98/47964.

The flowing waters, e.g., ground waters, effluent waters, leachate waters produced in the above-mentioned constructions or operations, with utilization of the water properties, have differing contents of dissolved water constituents. These predominantly inorganic water constituents frequently cause hard deposits. On entry of, for example, ground waters or leachate waters into drainage systems, the physical conditions change so that the originally dissolved water constituents form hard, firmly adhering deposits, which can be present in amorphous or crystalline form. These deposits (encrustations) usually consist of calcium carbonate, magnesium carbonate, calcium sulfate (gypsum), silicates ($SiO_2$), barium sulfate and iron oxides, all of which may be present in their hydrated form.

These hard, firmly adhering deposits diminish the outlet cross section, or in extreme cases completely close the outlet. As a result, the amounts of water produced can no longer drain off freely, and damming occurs, which can cause great damage.

In the swimming pool sector, for example, the water contained must be conditioned so that deposits do not occur on the pool walls or in pumps and filters. In the raw material exploration sector, e.g., oil extraction, the conditioning agents used there require high pressure stability and high thermal stability.

WO 94/19288 discloses a process for preventing the formation of deposits in a construction drainage system, which is characterized in that a conditioning agent which comprises a stabilizer for hardness constituents and a dispersant is added to the leachate water or ground water to be drained off.

Conditioning agents which are used are, inter alia, maleic anhydride polymers and copolymers.

U.S. Pat. No. 5,523,023 describes water treatment compositions based on polysuccinimide or its hydrolysates but not in combination with fatty acids or their derivatives.

U.S. Pat. No. 6,054,553 discloses water treatment compositions with a product containing recurring succinimide units but not in combination with fatty acids or their derivatives.

WO 95/16726 describes water conditioning agents with hydrolysated polymerisate of maleinimide.

EP 0 638 049 B1 and CH 689 452 A5 disclose processes for preventing cement-related deposits in a construction drainage system, the conditioning agent used being polyaspartic acid.

A disadvantage with the conditioning agents mentioned in the prior art is the fact that the hardness constituents/hardness stabilizers and dispersants used for this, owing to their high solubility in water, are readily transported away from the leachate water or ground water and therefore require permanent introduction of further conditioning agent.

Polyaspartic acid and certainly its salts, but also comparable compounds, e.g., polyacrylic acid, its copolymers and its salts, have the following disadvantages in practice:

In solid form they are highly hygroscopic substances, which can only be pressed to form slow-release tablets which are dimensionally stable in water having a high content of (inert) binder. This makes it difficult to have a high active compound content in the slow-release tablets.

The solubility of polyaspartates, polyacrylates or polyacrylate/poly-maleate copolymers in water is very high. Abrupt addition over a short period thus takes place. However, addition as uniform as possible would be expedient, which increases as far as possible in proportion to the pH (at very alkaline pH of the construction waters, usually the encrustation problem is also very great). This is difficult to achieve using the customary raw materials for slow-release tablets.

Polyaspartic acid and its salts, owing to their biodegradability, make possible immediate colonization by microorganisms which use these as substrate. The result is a biofilm on these slow-release tablets, which, in the vicinity of the tablet, leads to biofouling with corresponding corrosion problems with respect to concrete. Therefore, a substance which is only slightly water soluble and poorly biodegradable would be desirable, which can be considered as precursor for the actual active compound and releases this in low concentrations, but at sufficient concentrations in the context of scale inhibition. This would reduce the biofouling problems.

The thermal stability of polyaspartic acids is not always ensured at high temperatures.

It is an object of the present invention, therefore, to develop a novel conditioning agent for conditioning standing and flowing water systems whose correlation of action between dispersing properties and hardness stabilizer properties and its thermal stability is considerably superior to the prior art. Such a novel dispersant would be of broad applicability, for example to protect heat-transfer surfaces, as occurring in industrial plants, such as water circulation systems of any type (cooling water circulation systems) or else machines using process water, e.g., washing machines. At the same time, such a conditioning agent would be universally usable in standing waters, e.g., swimming pools, but also in extreme situations such as squeeze operations.

This object is achieved by, and the present invention therefore relates to, conditioning agents for conditioning standing and flowing water systems, characterized in that these comprise an active content of polysuccinimide (PSI), its hydrolysate or its partial hydrolysate, and a process for preventing deposits in standing or flowing water systems, characterized in that a polysuccinimide-based conditioning agent is added to the standing water or to the leachate water, ground water, effluent water or flowing water to be drained off.

SUMMARY

The invention relates to a conditioning agent comprising a component selected from the group consisting of an active content of polysuccinimide, partial hydrolysates of polysuccinimide, copolymers of polysuccinimide, or mixtures thereof in combination with fatty acids or their derivatives. The invention also relates to a process comprising: (A) adding a conditioning agent to a water component selected from the group consisting of standing water systems and flowing water systems, wherein the composition comprises a component selected from the group consisting of active content of polysuccinimide, partial hydrolysates of polysuccinimide, copolymers of polysuccinimide, or mixtures thereof in combination with fatty acids or their derivatives, and (B) preventing deposits in the water component. The invention also relates to a system comprising (i) a water component selected from the group consisting of standing water systems and flowing water systems and (ii) a conditioning agent for conditioning the water component, wherein the conditioning agent comprises a component selected from the group consisting of an active content of polysuccinimide, partial hydrolysates of polysuccinimide, copolymers of polysuccinimide, or mixtures thereof in combination with fatty acids or their derivatives.

DESCRIPTION OF THE DRAWINGS

These and other features, aspects, and advantages of the present invention will become better understood with reference to the following description and appended claims, where

DESCRIPTION

Figure 1:
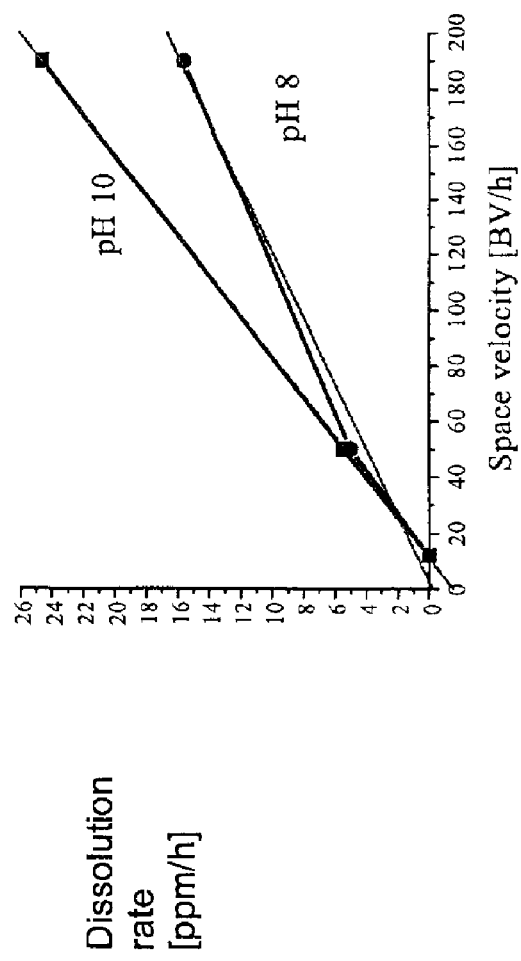
FIG. 1 is a graph that shows the dissolution of polysuccinimide at different pHs obtained in accordance with the invention.

The invention relates to a conditioning agent for conditioning standing and flowing water systems comprising a component selected from the group consisting of active content of polysuccinimide, partial hydrolysates of polysuccinimide, copolymers of polysuccinimide or mixtures thereof in combination with fatty acids or their derivatives.

The invention also relates to a process comprising adding a conditioning agent to a water component selected from the group consisting of standing water systems and flowing water systems, wherein the composition comprises a component selected from the group consisting of active content of polysuccinimide, partial hydrolysates of polysuccinimide, copolymers of polysuccinimide, or mixtures thereof, in combination with fatty acids or their derivatives, and preventing deposits in the water component.

The invention also relates to a system comprising (i) a water component selected from the group consisting of standing water systems and flowing water systems and (ii) a conditioning agent for conditioning the water component, wherein the conditioning agent comprises a component selected from the group consisting of an active content of polysuccinimide, partial hydrolysates of polysuccinimide, copolymers of polysuccinimide, or mixtures thereof in combination with fatty acids or their derivatives.

The term "active content," as used herein, means that the PSI is present in a conditioning agent at a sufficient amount so that when the conditioning agent is added to a water component, the conditioning agent prevents growth of crystallization nuclei of deposits and/or prevents the formation of hard deposits.

By adding a PSI-based conditioning agent to the water to be treated, the growth of the crystallization nuclei can be effectively prevented. At the same time, the formation of hard deposits becomes impossible. As already described above, in the context of the present invention, PSI is taken to mean polysuccinimide itself, its copolymers or its partial hydrolysates.

Conditioning agents for aqueous systems are described variously, based on their mode of operation, e.g., as dispersant, hardness stabilizers and protective colloids. These also include sequestering agents (complexing agents) and, if appropriate, also other surface-active substances (surfactants) and biocides. Those which are of importance are, in particular, hardness stabilizers, that is to say compounds which are suitable for stabilizing the hardness constituents in drainage systems, in which case they deactivate crystal growth and generally have properties which change the surface charge, and dispersants. Dispersants are compounds which change the surface charge and disperse undissolved solid particles in the water, including in the colloidal region, that is to say keep them finely distributed. Inventive conditioning agents based on PSI are added to the standing or flowing water system as a function of the respective field of application.

Thus, the oil or natural gas exploration processes, in particular squeeze operations, require significantly higher amounts of PSI than the use in standing water systems, e.g., swimming pools. PSI is therefore added to the standing or flowing water system, preferably in aqueous solution, in amounts that range from about 0.1 to about 10,000 g/m$^3$, in particular from about 0.5 to about 5000 g/m$^3$, of the water system to be conditioned. PSI can be used individually or in a mixture with other conditioning agents.

The effect of hardness stabilizers and dispersants frequently overlap. Therefore, conditioning agents are preferably also combined together with hardness stabilizers or dispersants, with efficiency generally being higher than separate use. Conditioning agents can also comprise other suitable additives, however, for treating the leachate water or ground water to be drained off, the decisive factor must be that the use of a specific conditioning agent or conditioning agent mixture achieves environmentally compatible prevention of encrustations.

The PSI, its copolymers, or partial hydrolysates to be used inventively as conditioning agent in combination with fatty acids or their derivatives show a very favorable correlation of activity between dispersion properties and hardness stabilizer properties and are used in combination with a slow-release effect, that is to say gradual release of the active compound polyaspartic acid, for conditioning standing and flowing water systems, in particular construction drainage, e.g., tunnel drainage and in oil exploration. PSI, its copolymers or partial hydrolysates in combination with fatty acids or their derivatives are therefore particularly suitable for preventing deposits, in particular of calcium carbonate, magnesium carbonate, calcium sulfate, silicates, barium sulfate or iron oxides. In addition, PSI exhibits the following advantages for conditioning standing and flowing water systems:

PSI is non-hygroscopic and may be pressed to give dimensionally stable slow-release tablets having a low binder content of, e.g., $\leq 10\%$.

PSI, as imide, has a higher active compound content, based on weight, than the sodium-containing sodium polyaspartate.

PSI dissolves slowly, the dissolution rate increasing with pH; therefore it displays the desired slow-release property.

PSI, owing to its low solubility, has a degradation behavior which is retarded with respect to polyaspartic acid, with correspondingly reduced biofouling potential.

PSI, owing to its acid-releasing property, is able to decrease and detach lime deposits. In contrast to the readily soluble organic acids, the insoluble PSI ensures retention of the active compound precursor at the encrustation site.

PSI can be produced on an industrial scale by thermal polymerization of maleic anhydride and ammonia or its derivatives (see U.S. Pat. Nos. 3,846,380; 4,839,461; 5,219,952 or 5,371,180).

In addition, PSI is obtained by thermal polymerization of aspartic acid (U.S. Pat. No. 5,051,401) in the presence or absence of acid catalysts/solvents (U.S. Pat. No. 3,052,655).

PSI is produced in the chemical synthesis as a polymer having a mean molar weight of 500 to 20,000, preferably 3000 to 5000. Polysuccinimide is to be considered as a chemical precursor of polyaspartic acid, to which it is slowly hydrolysed with water. The pH of the resultant solution has a pH from 1 to 4, preferably 2 to 3. This brings into effect not only the good scale-dissolving action, but also simultaneously the dispersing action of the polyaspartic acid released by PSI towards sparingly soluble calcium salts and other sparingly soluble substances. The resultant acidic solution, owing to its acidic action, also leads to direct dissolution of any calcium carbonate encrustations formed. Especially in hard mountain waters having an elevated pH and thus intensified encrustation problems, PSI expediently demonstrates increased solubility. In addition, PSI, because of its slow hydrolysis but at the same time low water solubility, is active for a long time at the point of use and is thus significantly superior (slow-release effect) to the direct use of polyaspartic acid.

If appropriate, in addition to the combination of PSI with fatty acids or their derivatives, other hardness stabilizers can be used in the inventive conditioning agent. Additional hardness stabilizers which can be used are compounds of the group consisting of inorganic condensed phosphates, such as alkali metal diphosphates, triphosphates and polyphosphates, organic phosphorus compounds or organophosphonic acids, e.g., 2-methyl-propanephosphonic acid, hydroxyethylidene diphosphonic acid, aminomethylenephosphonic acids, N-containing phosphonates, aminophosphonates, aminoalkylenephosphonic acids such as aminotri(methylenephosphonic acid) or diethylenetriamino-penta (methylenephosphonic acid), poly (aminomethylenephosphonates), or hydroxyethylethylene (di(aminomethylene)phosphonic acid), in addition phosphonocarboxylic acids, e.g., phosphonobutane-tricarboxylic acid, phosphate esters, polyphosphoric esters, aminophosphates, succinamide, carbohydrates, polysaccharides, gluconates, polyglycosides, polyglucosides and their derivatives, polyoxycarboxylic acids and their copolymers, oxidized carbohydrates, such as oxidized cellulose, starch or dextrin, proteins and other protein products, water-soluble polyamino acids, e.g., polyaspartic acid, silicates such as alkali metal silicates, water glass and zeolites.

The water-soluble salts of the acids listed are also suitable as hardness stabilizers, in addition to PSI, preferably the sodium salts.

In a particularly preferred embodiment of the present invention, PSI is present in the conditioning agent together with polyaspartic acid. Since PSI hydrolyses to form polyaspartate under suitable conditions, but must itself be considered hydrophobic, the inventive formulation receives a slow-release action of hardness stabilizer.

Suitable dispersants for inventive conditioning agents based on PSI and fatty acids or their derivatives for conditioning standing and flowing water systems are, inter alia: tannin derivatives, such as sulfited tannins, lignin sulfonates, sulfonated condensation products of naphthalene with formaldehyde, anionic polyelectrolytes, e.g., acrylate-based polymers, such as polyacrylates, polymethacrylates, polyacrylamides and copolymers of acrylic acid or methacrylic acid and acrylamide, in addition P-containing polymeric compounds, such as N-phosphomethyl-macrocyclic polyethers or phosphonomethylated oxyalkyleneamines and phosphinic-acid-containing homopolymers and copolymers of acrylic acid and acrylamide and oligomeric phosphinicosuccinic acid compounds (as described in U.S. Pat. No. 4,088,678). Other suitable compounds are polymers having N-substituted amide functions, e.g., sulfomethylated or sulfoethylated polyacrylamides and polymethacrylamides and copolymers or terpolymers with acrylic acid and maleic ester, N-butylacrylamide and its copolymers and acrylamidopropionic sulfonic acid as salt and its copolymers, and in addition phosphinoalkylated acrylamide polymers and copolymers with acrylic acid, copolymers of alkenes with unsaturated dicarboxylic acids, and polymers and copolymers based on maleic acid. Such compounds and similar compounds are described, for example, in EP-A 225 596, EP-A 238 852, EP-A 238 853, EP-A 238 729, EP-A 265 846, EP-A 310 099, EP-A 314 083, EP-A 330 876 or EP-A 517 470. Water-soluble salts of corresponding acids are also suitable.

In addition, sequestering agents can be added to an inventive conditioning agent based on PSI for conditioning standing and flowing water systems.

Complexing agents which are suitable for the purposes of the present invention are, inter alia, iminodisuccinate (IDS), nitrilotriacetic acid, citric acid, ethylenediaminetetraacetic acid (EDTA), ethercarboxylates or oxidized carbohydrates, e.g., partially hydrolysed and oxidized starch or dextrin. In addition, phosphorus-containing complexing agents are suitable, for example condensed phosphates and phosphonates, if these are not already in use in their function as hardness stabilizers.

Other additives can be added to an inventive PSI/fatty acid or their derivatives-based conditioning agent for conditioning standing and flowing water systems, for example aluminate compounds (see EP-A 0 302 522), stabilizers, such as polyquaternary amines, for example poly(dimethylamino-co-epichlorohydrin) or poly(diallyldimethylammonium chloride) (as described in U.S. Pat. No. 5,038,861), or suitable surfactants, for example alkylaryl sulfonates, polyvinylsulfonates, sodium-methoxymethyl cellulose, etc.

As already described above, biocides can be added to an inventive PSI/fatty acid or their derivatives-based conditioning agent for conditioning standing and flowing water systems, to restrict the growth of microorganisms. In principle, all biocides which are to be employed to keep waters clean in accordance with national regulations are suitable for this. Preferred biocides for the purposes of the present invention are phthalimidoperoxohexanoic acid, dibenzoperoxide, chloro-bromodimethylhydantoin or other organic peroxides.

The inventive conditioning agents can be used in customary form, e.g., powders, tablets or slow-release tablets. Furthermore, however, other application forms are also possible which support the slow-release action (that is to say the action of gradually releasing active compound at a constant rate of time) of PSI in the form of water-permeable or self-dissolving patches of suitable synthetic or biodegradable polyester amides, for example embedding in BAK™ (Bayer AG), in which case the PSI converts into polyaspartic acid in accordance with the biodegradation of the matrix (polyester amide).

According to the invention PSI is pressed to form slow-release tablets or other tablets using fatty acids or their derivatives. These fatty acids (carbonic acis) or their derivatives are saturated or unsaturated linear or branched aryl- or alkylcompounds having 5 to 50 carbon atoms, preferred 5 to 20 carbon atoms, of the group consisting of carbonic acids, salts of carbonic acids, carbonic acid esters, carbonic acid amides, carbonic acid nitrites, amines, alcohols, and their esters with organic or inorganic acids, ethers, sulphonates, thioesters or thioethers, while the functional groups of these aids to PSI are primary, secondary, or tertiary.

Preferred aids to PSI according to the present invention are $C_5$–$C_{50}$-carbonic acids (fatty acids), especially preferred $C_5$–$C_{20}$ fatty acids, in particular stearic acid, palmitic acid or lauric acid.

Slow-release tablets are presented by way of example in the Swiss Construction Journal of the SIA "Schweizer Ingenieur und Architekt", No. 12 Mar. 24, 2000.

As such, Applicants' invention provides valuable benefits to the industry. For instance, Applicants' invention is a dispersant having broad applicability such that it can be used to protect surfaces such as heat-transfer surfaces of industrial plants, water circulation systems of any type (cooling water circulation systems) or machines that use process water, e.g., washing machines. Also, the invention in accordance with the invention conditioning agent is universally useful in standing waters, e.g., swimming pools, and also in extreme situations such as squeeze operations.

The invention is further described in the following illustrative examples in which all parts and percentages are by weight unless otherwise indicated.

EXAMPLES

Formulation Examples

90% PSI was mixed intimately with 10% palmitic acid or stearic acid and this mixture was pressed by a tabletting machine to form tablet-like shaped bodies. These shaped bodies were used, at a dissolution rate of 70 mg/h, weight 50 g, in an amount such that a concentration in the leachate waters of approximately 0.1 to 100 ppm was ensured.

A further example for neutral waters comprised 70% PSI, 25% polyaspartic acid sodium salt (PASP) and 4.5% palmitic or stearic acid and 0.5% dibenzoyl peroxide.

Use Examples

Experimental Description (dissolution of PSI at different pHs)

A small continuous-flow sample cell was charged with 500 mg of PSI in such a manner that at any timepoint of measurement sufficient substance was still available for the dissolution. A pH-adjusted solution flowed through the cell at a flow rate of 2.25 ml/min.

Solution was taken off from a reservoir (volume 2000 ml), passed through the pump and then through the continuous-flow cuvette (which was controlled to a constant temperature of 25° C.) in the fluorescence spectrometer. From here it reached the sample cell in which it flowed past the PSI, in order then to pass back into the reservoir.

The excitation and emission wavelengths were, typically for detection of polyaspartic acid, 334 nm and 411 nm. The increase in polyaspartic acid concentration was determined as a function of time from the correlation between fluorescence and concentration (calibration line), the increase in concentration which was established being expressed as increase in concentration per unit of time. The fluorometric determination method is described in DE-A 10 042 498 in detail for the detection of polyaspartic acids, but it may also be used to determine the gradual release of polyaspartic acid from PSI.

Experimental Result

Under the conditions described above, dissolution rates were determined for the following pHs shown in Table 1:

TABLE 1

| pH | Dissolution rate [ppm/h] |
|---|---|
| 8 | 15.6 |
| 10 | 24.6 |
| 11 | 31.2 |
| 12 | 130.7 |

The PSI dissolution rate increased with increasing pH. This is an advantageous property of the material, since at elevated pH the solubility of calcium carbonate was markedly decreased and self-regulation was thus present. At pHs where the encrustation problem was greatest, PSI released the most polyaspartic acid to the solution.

Dissolution proportional to the flow rate was also of importance for a self-regulating system (with respect to an active compound concentration to be established).

Experimental Description (flow past PSI at different flow rates)

A small continuous-flow sample cell was charged with 500 mg of PSI in such a manner that at any timepoint measurement sufficient substance was still available for the dissolution. The solution was passed through the cell at various flow rates but constant pH.

From a reservoir—the aqueous solution volume is 2000 ml—solution was taken off, passed through the pump and then through the continuous-flow cuvette (which was controlled to a constant temperature of 25° C.) in the fluorescence spectrometer. From here it reached the sample cell in which it flowed past the PSI, in order then to pass back into the reservoir.

The excitation and emission wavelengths were, typically for detection of polyaspartic acid, 334 nm and 411 nm.

Experimental Result

Under the conditions described above, dissolution rates were determined for the following flow rates shown in Table 2:

TABLE 2

| pH | Flow rate [ml/min] | Solubility [ppm/h] | Solubility [%] |
|---|---|---|---|
| 8 | 0.138 | 0.0177 | $1.1 \times 10^{-3}$ |
| 8 | 0.6 | 5.0 | 32.1 |
| 8 | 2.25 | 15.6 | 100 |
| 10 | 0.138 | 0.0193 | $7.8 \times 10^{-3}$ |
| 10 | 0.6 | 5.5 | 22.4 |
| 10 | 2.25 | 24.6 | 100 |

When the dissolution rate, measured in [ppm/h], was plotted against a space velocity, measured in bed volumes per hour (BV/h), low PSI dissolution rates for low flow rates could be seen.

The high activity of the PSI, particularly in the alkaline range, also became clear. At relatively high pH, at low flow rates the PSI dissolution was reduced to less than a quarter, while at low pHs, the PSI dissolution rate was reduced to one third (see FIG. 1).

This meant that at a high pH and thus increased material flow a sufficient conditioning agent was released, so that the system retained activity and nevertheless dealt sparingly with the resources.

Although the present invention has been described in detail with reference to certain preferred versions thereof, other variations are possible. Therefore, the spirit and scope of the appended claims should not be limited to the description of the versions contained therein.

What is claimed is:

1. A conditioning agent for conditioning a water component selected from the group consisting of standing water systems and flowing water systems comprising a component in tablet form selected from the group consisting of (1) an active content of a polysuccinimide component selected from the group consisting of polysuccinimide, partial hydrolysates of polysuccinimide, copolymers of polysuccinimide, and mixtures thereof; and (2) a fatty acid.

2. The conditioning agent according to claim 1, wherein the conditioning agent further comprises a hardness stabilizer selected from the group consisting of inorganic condensed phosphates, organophosphonic acids, phosphate esters, polyphosphoric esters, aminophosphates succinamide, carbohyrates polysaccharides, gluconates, polyglycosides, polyglucosides derivatives, polyoxycarboxylic acids, polyoxycarboxylic copolymers, oxidized carbohydrates, proteins, water-soluble polyamino acids, silicates and zeolites.

3. The conditioning agent according to claim 1, wherein the conditioning agent further comprises a dispersant component selected from the group consisting of tannin derivatives; lignin sulfonates; sulfonated condensation products of naphthalene with formaldehyde; polyacrylates; polymethacrylates; polyacrylamides; acrylate-based polymers; P-containing polymeric compounds; phosphinic-acid-containing homopolymers and copolymers of acrylic acid and acrylamide; oligomeric phosphinico-succinic acid compounds; sulfomethylated or sulfoethylated polyacrylamides and copolymers and terpolymers with acrylic acid and maleic ester; N-butylacrylamide and copolymers thereof; acrylamidopropionic sulfonic acid as salt and its copolymers; polymers and copolymers of maleic acid or maleic anhydride; phosphinoalkylated acrylamide polymers; copolymers with acrylic acid; and copolymers of alkenes with unsaturated dicarboxylic acids.

4. The conditioning agent according to claim 1, wherin the conditioning agent further comprises complexing agents selected from the group consisting of iminodisuccinate, nitrilotriacetic acid, citric acid, ethylenediaminetetraacetic acid, ethercarboxylates, oxidized carbohydrates and phosphorus-containing compounds.

5. The conditioning agent according to claim 1, wherein the agent further comprises additives.

6. The conditioning agent according to claim 5, wherein the additives are biocides.

7. The conditioning agent according to claim 1, wherein the polysuccinimide is in a form which the polysuccinimide has an increasing slow-release action.

* * * * *